Figure 1:
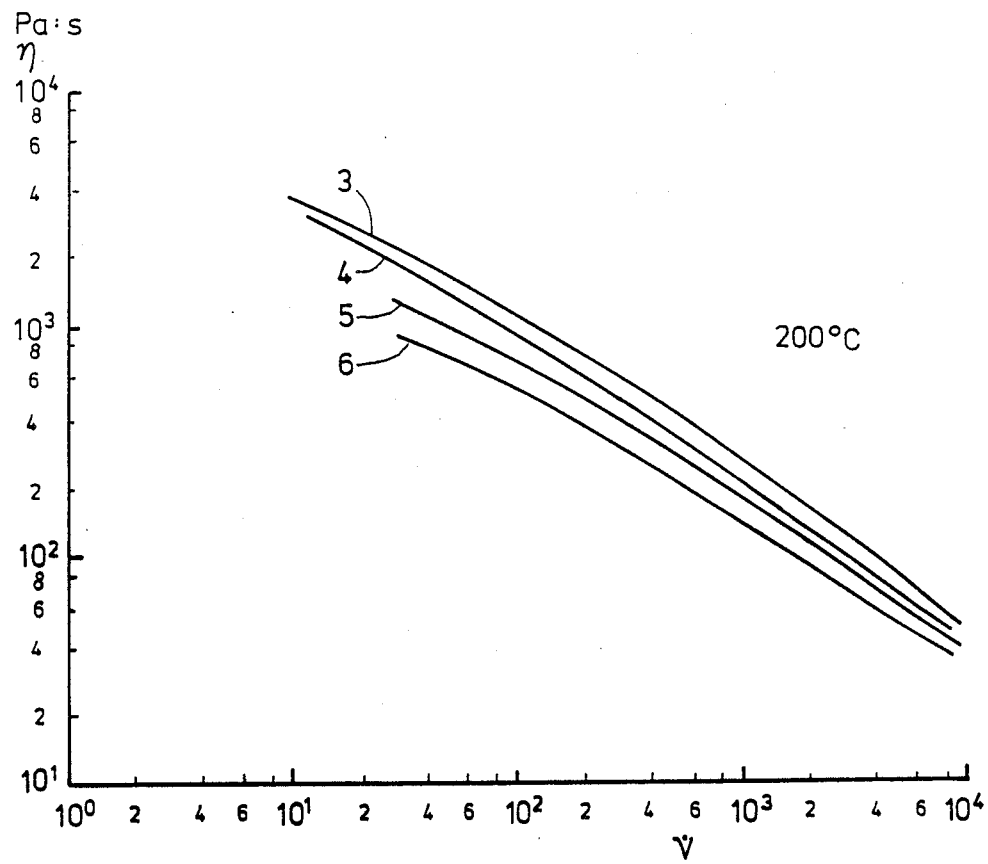

United States Patent [19]

Eichenauer et al.

[11] Patent Number: 4,940,747
[45] Date of Patent: Jul. 10, 1990

[54] MOULDING MATERIALS, BASED ON VINYL CHLORIDE POLYMERS, WITH IMPROVED PROCESSABILITY

[75] Inventors: Herbert Eichenauer, Dormagen; Christian Lindner, Cologne; Karl-Heinz Ott, Leverkusen; Hans-Eberhard Braese, Cologne, all of Fed. Rep. of Germany

[73] Assignee: Bayer Aktiengesellschaft, Leverkusen, Fed. Rep. of Germany

[21] Appl. No.: 931,247

[22] Filed: Nov. 17, 1986

[30] Foreign Application Priority Data

Nov. 30, 1985 [DE] Fed. Rep. of Germany ....... 3542469

[51] Int. Cl.$^5$ .......................... C08K 5/12; C08L 9/00; C08L 27/06; C08L 55/02
[52] U.S. Cl. .................................... 524/504; 524/143; 524/153; 524/297; 524/315; 524/523; 524/524; 524/525; 524/526; 524/527; 525/78; 525/80; 525/83; 525/86; 525/87; 525/221; 525/222; 525/227; 525/232; 525/233; 525/235; 525/236; 525/237; 525/238; 525/239

[58] Field of Search .................. 525/83, 86, 212, 227, 525/238, 239, 78, 80, 87, 221, 232, 235, 233, 236; 524/143, 153, 297, 315, 504, 523, 524, 525, 526, 527

[56] References Cited

U.S. PATENT DOCUMENTS

| 4,267,084 | 5/1981 | Mizutani et al. | 525/239 |
| 4,304,884 | 12/1981 | Okamoto | 525/239 |
| 4,657,976 | 4/1987 | Ott et al. | 525/239 |

FOREIGN PATENT DOCUMENTS 0159689 10/1985 European Pat. Off. .

Primary Examiner—Allan M. Lieberman
Attorney, Agent, or Firm—Connolly and Hutz

[57] ABSTRACT

Thermoplastic moulding materials, of vinyl chloride polymers, which contain a polymer, prepared in the presence of mercaptans, from styrene, α-methylstyrene, vinyltoluene, acrylonitrile, methyl methacrylate or mixtures thereof and which possess improved processing properties.

3 Claims, 1 Drawing Sheet

MOULDING MATERIALS, BASED ON VINYL CHLORIDE POLYMERS, WITH IMPROVED PROCESSABILITY

Vinyl chloride polymers (particularly polyvinylchloride) represent common raw materials for the preparation of a very wide range of plastic articles; as is known, the characteristic property profile of vinyl chloride polymers can be varied within a wide range or modified by combination of the vinyl chloride polymers with other substances: whereas for example, unmodified or slightly modified polyvinylchloride (so-called "rigid PVC") is particularly suitable for the preparation of moulded articles which display an average processing behaviour, average heat distortion resistance with moderate toughness and relatively low flexibility, plastic articles ("soft PVC") which have high flexibility and elasticity at use temperatures can be produced by combination of, for example, polyvinyl chloride with so-called plasticizers having low or average molecular weights; such plasticizers are, for example, phthalates, epoxide compounds, aliphatic diesters, phosphates, polyesters having molecular weights up to about 3,000, trimellitates, citrates or certain aliphatic, optionally chlorinated, hydrocarbons; a large number of these plasticizers are known (cf., for example, "Encyclopedia of PVC", Mariel Dekker, INC, New York, 1976). Combinations of so-called polymeric plasticizers (polymers having relatively high molecular weights) with vinyl chloride polymers permit, in addition, the production of soft PVC moulded articles with improved mechanical properties (eg. improved abrasion resistance, elasticity, solvent stability and flame resistance); known plasticizers are, for example, partially crosslinked butadiene-acrylonitrile copolymers (e.g. having about 29% of acrylonitrile, Mooney viscosities [ML 4, 100° C., DIN 53 523]of 60 to 100) cf., for example, EP-5 736, certain polyurethanes (DE-OS-1 193 241)and also selected ethylenevinyl acetate copolymers which are soluble in organic solvents (cf., for example, EP-A-5 736).

Plastic blends of high notched impact strength can be obtained by combination of, for example, vinyl chloride polymers with graft polymers of the monomers styrene, α-methylstyrene, acrylonitrile and/or methyl methacrylate on rubber-type substrates such as the butadiene polymers or acrylate rubbers, or with graft polymers of vinyl chloride on selected ethylene-vinyl acetate copolymers (for example having 45% of vinyl acetate and 55% of ethylene) or other polyethylene derivatives; the rubber components in these graft polymers must be of different form to the rubbers which can optionally simultaneously be employed as polymer plasticizers - as mentioned above; these differences are in the chemical composition, the crosslinking characteristics, the particle morphology, the graft characteristics and the proportion in the vinyl chloride polymer.

On the other hand, specific modifiers permit the heat resistance of vinyl chloride polymers to be lifted to a higher level. Such modifiers are, for example, copolymers from the series of monomers comprising styrene, α-methylstyrene, acrylonitrile and methyl methacrylate.

In order to make industrial processing of this large number of polymer combinations possible, effective stabilization of the systems is necessary, for example against thermal, photolytic and chemical degradation. In addition, additives which optimize the processing conditions of the respective system are necessary and customary. Suitable stabilizers and processing auxiliaries are, for example, stabilizers containing Ba/Cd, Pb, Sn or Zn or organic stabilizers, and also phenolic, optionally S-or P-containing antioxidants, epoxide compounds, waxes, low molecular weight and high molecular weight lubricants; such auxiliaries and their processing conditions are described, for example, in "Kunststoff-Handbuch" [Plastics Handbook], Carl Hanser Verlag, Munich (1963).

In order to be able to prepare moulding materials, based on vinyl chloride polymers, having optimal technical property profiles, new, specific polymer combinations and polymer additives must continually be found which achieve the aim set by the user and consumer of the plastic.

It is the state of the art to prepare a very wide range of applicationally relevant PVC blends of these combinations of PVC with at least one polymer or additive from the series comprising the plasticizers, resin polymers, rubbers, graft rubbers, fillers and stabilizers. Such blends have achieved great importance besides PVC moulding materials which are pure in principle.

In spite of the excellent properties of such polymer compositions, they can, nevertheless, display certain applicational disadvantages which limit the possibilities of use of such mixtures.

One such disadvantage is, for example, the unsatisfactory flowability, which can lead to problems, particularly in the production of large-format parts and parts with complicated structure, and can often only be circumvented by elevated processing temperatures. However, a damaging temperature effect, which is associated with this, on the polymer is then unavoidable; surface flaws on the moulded articles are a result which occurs frequently.

Surprisingly, it has now been found that the overall properties, particularly the processing properties, of moulding materials based on vinyl chloride polymers can be significantly improved by addition thereto of thermoplastic polymers which have a limiting viscosity of 2 to 15 ml/g (measured in dimethylformamide at 25° C.) and a sulphur content of 1.15 to 3.95% by weight. Compared to conventional lubricants, the addition of these compounds has the advantage of not leading to migration, surface flaws, deposits in the mould or formation of specks.

Accordingly, the invention relates to vinyl chloride polymer moulding materials which contain 0,1 to 20% by weight, preferably 0,5 to 15% by weight and particularly preferably 1 to 10% by weight of a polymer from styrene, α-methylstyrene, vinyltoluene, acrylonitrile, methyl methacrylate or mixtures thereof having a limiting viscosity of 2 to 15 ml/g (measured in dimethylformamide at 25° C.) and a sulphur content of 1.15 to 3.95% by weight.

In addition, the moulding materials according to the invention can contain (relative to 100 parts of the total moulding material):

(A) up to 80 parts by weight, preferably up to 50 parts by weight and particularly preferably up to 15 parts by weight, of a graft polymer, prepared by graft polymerization of styrene, α-methylstyrene, methyl methacrylate, acrylonitrile, vinyl chloride or mixtures thereof onto an elastomer having a glass transition temperature $T_g < 0°$ C. and a mean particle size ($d_{50}$) of 0.05 to 10 μm, particularly 0.08 to 1 μm, (B) up to 90 parts by weight, preferably up to 70 parts by weight and particularly preferably up to 30 parts by weight, of a resinous thermoplastic copolymer from styrene, α-methylstyrene, p-methylstyrene, vinyltoluene, methyl methacrylate, (meth)acrylonitrile or mixtures thereof having a limiting viscosity $\geq 0.3$ dl/g (measured in dimethylformamide at 25° C.), (C) up to 50 parts by weight, preferably up to 30 parts by weight and particularly preferably up to 20 parts by weight, of a rubber from the series comprising the diene homo- or diene copolymers, olefine rubbers, chlorinated polyolefines, or mixtures thereof, (D) up to 70 parts by weight, preferably up to 60 parts by weight and particularly preferably up to 30 parts by weight, of plasticizer from the series comprising the low molecular weight and high molecular weight compounds, particularly the high molecular weight compounds, the so-called polymer plasticizers.

In the context of the invention, vinyl chloride polymers are, in particular, polyvinyl chloride and copolymers of vinyl chloride having up to 50% by weight of copolymerizable compounds from the series comprising the vinyl esters, maleic anhydride or semi-esters of maleic acid.

The vinyl chloride polymers which are suitable according to the invention can be prepared by known industrial processes, for example by emulsion polymerization, suspension polymerization or bulk polymerization processes.

In the context of the invention, polymers from styrene, α-methylstyrene, p-methylstyrene, vinyltoluene, acrylonitrile, methyl methacrylate or mixtures thereof are those polymers which have a limiting viscosity of 2 to 15 ml/g (in DMF at 25° C.) and a sulphur content of 1.15 to 3.95% by weight.

The polymers can be prepared, for example, by solution polymerization, bulk polymerization, emulsion polymerization or suspension polymerization processes, known surfactant compounds and initiators, particularly radical generators, being used. The polymers are preferably prepared by emulsion polymerization. Here, the monomers are polymerized in certain amount ratios in the presence of mercaptans. Examples of suitable mercaptans are ethyl mercaptan, n-propylmercaptan, n-butylmercaptan, tert.-butyl mercaptan, n-pentyl mercaptan, n-hexyl mercaptan, n-octyl mercaptan, n-decyl mercaptan, n-dodecyl mercaptan, tert.-dodecyl mercaptan, n-hexadecyl mercaptan and n-octadecyl mercaptan.

Those polymers are preferred which have been prepared by polymerization of a mixture of 50 to 80 parts by weight of styrene or α-methylstyrene, 10 to 30 parts by weight of acrylonitrile and 7.5 to 25 parts by weight of tert.-dodecyl mercaptan.

The polymers are worked up by known processes, for example the isolation from the latex form can be carried out by spray drying or electrolyte coagulation; however, the latices which arise can also be mixed with other latices of the composition components according to the invention and coagulated together.

Suitable graft polymers (A) are products which are obtained by graft polymerization of styrene, α-methylstyrene, methyl methacrylate, vinyl chloride or mixtures thereof onto an elastomer base, having a glass transition temperature $<0°$ C. Preferred graft products have rubber contents of 20 to 80% by weight.

Examples of suitable elastomer bases for the preparation of graft polymers are polybutadiene, polyisoprene, styrene-butadiene copolymers, acrylonitrile-butadiene copolymers, acrylate rubbers, EPM rubbers (ethylene/propylene rubbers) and EPDM rubbers, (ethylene/propylene/diene rubbers which contain a non-conjugated diene, such as, for example, hexa-1,5-diene or norbornadiene, as diene in small amounts).

Preferred graft polymers are graft products of styrene/acrylonitrile mixtures on polybutadiene (ABS polymers), of styrene/methyl methacrylate mixtures on polybutadiene and of styrene/acrylonitrile mixtures on acrylate rubber (ASA polymers).

Emulsion polymerization, suspension polymerization or precipitation polymerization processes can be employed for the preparation of the suitable graft polymers. Particularly suitable processes are emulsion polymerizations or combinations of emulsion and suspension polymerizations. If appropriate, antioxidants (for example of the phenol type) can be added subsequently to the graft polymerizations. Graft polymers in the context of the invention are known.

Suitable resinous thermoplastic copolymers (B) are, for example, styrene/acrylonitrile copolymers, α-methylstyrene/acrylonitrile copolymers, methyl methacrylate/acrylonitrile copolymers which, if appropriate, can contain, incorporated, relatively small amounts of further monomers, such as, for example, methacrylic acid esters of $C_{2-8}$-alcohols or acrylic acid esters of $C_{1-6}$-alcohols.

The thermoplastic additives can be prepared, for example, by solution processes, bulk processes, emulsion processes or suspension processes, in the presence of known surfactants and initiators, particularly radical generators. Such polymers can be isolated either from the latex which is formed (for example by spray drying or electrolyte coagulation) or by mixing the latices which arise with other latices of the composition components according to the invention and coagulating together. The thermoplastic polymers (B) are known.

As component (C), butadiene copolymer rubbers, such as, for example, butadiene/acrylonitrile copolymers, ethylene-vinyl acetate copolymers or ethylene-acrylate copolymers, ethylene-vinyl acetate-carbon monoxide terpolymers or chlorinated polyolefines, such as, for example, chlorinated polyethylene, can be used.

The rubbers are conventionally prepared by emulsion polymerization, all known processes, such as, for example, solution polymerization in organic media, bulk polymerization, emulsion polymerization or precipitation polymerization, being suitable for the preparation of ethylene polymers.

As plasticizer component (D), low molecular weight compounds, such as phosphates, phthalates, adipates or sebacates, or high molecular weight compounds, such as polyester plasticizers, adipate-carbonate mixed esters or elastomeric polyurethanes, for example, are suitable.

The moulding materials according to the invention can be processed by conventional methods of polyvinyl chloride processing, for example by injection moulding, extrusion, blow moulding, deep drawing or calendering.

As follows from the examples below, the moulding materials according to the invention have a significantly improved processability.

The disadvantages which occur on addition of other processability-improving additives, such as, for example, exudation of the additives, high volatility with formation of coatings (so-called "fogging") and migration of the additives on contact with organic media, and also negative effects on the mechanical properties, do not occur in this case.

The limiting viscosities were determined in the solvent specified in each case.

For the definition of Staudinger index and gel content, cf.: M. Hoffmann, H. Krömer, R. Kuhn, "Polymeranalytik I und II [Polymer Analysis I and II]" GeorgThieme Verlag, Stuttgart (1977).

The graft rubber particle sizes are d50 values (for definition, cf. ultracentrifuge measurements: W. Scholtan, H. Lange, Kolloidz. und Z. Polymere 250 (1972), 782–796).

EXAMPLES

1. Products employed 1.1 Polyvinyl chloride having a K value of 70

1.2 Diisodecyl phthalate 1.3 ABS graft polymer from 30 parts by weight of a polybutadiene having mean particle diameters of 0.4 μm ($d_{50}$ value) and 70 parts by weight of a SAN resin with 34% by weight of acrylonitrile 1.4 ABS graft polymer from 87 parts by weight of an α-methylstyrene-acrylonitrile copolymer with 31% by weight of acrylonitrile and 13 parts by weight of a graft polymer from 50% of a finely divided component having average particle sizes of 0.1 um ($d_{50}$ value) and 50% of a coarsely divided component having mean particle sizes of 0.4 μm ($d_{50}$ value), the graft polymer mixture being made up from 50% by weight of a SAN resin having an acrylonitrile content of 28% by weight.

1.5 ABS graft polymer corresponding to 1.4), the proportion of α-methylstyrene-acrylonitrile copolymer component being 67 parts by weight.

1.6 Sulphur-containing resin component according to the invention 3.06 parts of styrene, 1.19 parts of acrylonitrile and 0.75 part of tert.-dodecyl mercaptan are emulsified, under nitrogen, together with 0.08 part of the sodium salt of disproportionated abietic acid in 68 parts of water, whereafter 0.3 part of potassium persulphate (dissolved in 24 parts of water) are added and the mixture is warmed to 65° C. A mixture of 58.14 parts of styrene, 22.61 parts of acrylonitrile and 14.25 parts of tert.-dodecyl mercaptan and a solution of 1.92 parts of the sodium salt of disproportionated abietic acid in 25 parts of water are subsequently metered in over the course of 4 hours, the reaction temperature of 65° C. being maintained. After a post-reaction period, the latex is coagulated with a cold magnesium sulphate/acetic acid solution. The polymer, obtained in a yield of 97% after drying at 70° C. in vacuo, has a sulphur content of 2.3% and a limiting viscosity of 6.7 ml/g (in dimethylformamide at 25° C.).

1.7 ABS graft polymer from 75 parts by weight of a polybutadiene having mean particle diameters of 0.4 μm ($d_{50}$ value) and 25 parts by weight of a SAN resin with 28% by weight of acrylonitrile.

1.8 Thermoplastic resin copolymer, from 69 parts by weight of α-methylstyrene and 31 parts by weight of acrylonitrile, having a Staudinger index of 0.59 dl/g (DMF, at 25° C.).

1.9 Butadiene-acrylonitrile copolymer rubber having an acrylonitrile content of 30% by weight and a gel content of 60% by weight.

1.10 SAN resin having an acrylonitrile content of 26% by weight and a Staudinger index of 6 dl/g, measured in DMF at 25° C.

1.11 Poly(methyl methacrylate) having a Staudinger index of 1.5 dl/g, measured in DMF at 25° C.

2. Production of moulded articles

The components, in the weight ratios specified in the tables, are mixed on a roller at 180° to 190° C. (within 15 minutes) and subsequently moulded to moulded articles at a temperature of 190° C.

TABLE 1

| Ser. No. | Recipe | Parts by weight | Tensile strength | Elongation | Tear propagation resistance | Vicat A | MFI value |
|---|---|---|---|---|---|---|---|
| 1[1] | 1.1 | 40 | 20.9 | 155 | 87.9 | 57 | 15.0 |
| | 1.2 | 20 | | | | | |
| | 1.3 | 40 | | | | | |
| 2[2] | 1.1 | 40 | 22.6 | 175 | 89.0 | 58 | 19.4 |
| | 1.2 | 20 | | | | | |
| | 1.3 | 38.8 | | | | | |
| | 1.6 | 2.4 | | | | | |

All compounds contain 1.5 parts by weight of ® Irgastab 17 M (Ciba-Geigy Marienburg GmbH) as stabilizers and 0.2 part by weight of ® Loxiol G 70 (Henkel & Cie) as lubricant
MFI: Melt flow index
[1] Comparison experiment
[2] Composition according to the invention
As follows from Table 1, moulding material 2 with the additive 1.6 according to the invention has better flow properties than the comparison moulding material 1.

TABLE 2

| Serial No. | Recipe | Parts by weight | Ball indentation hardness | Notched impact strength | Vicat A |
|---|---|---|---|---|---|
| 3[1] | 1.7 | 45 | 84.2 | 4.0 | 90 |
| | 1.7 | 11 | | | |
| | 1.8 | 44 | | | |
| 4[2] | 1.1 | 45 | 86 | 3.5 | 89 |
| | 1.7 | 11 | | | |
| | 1.8 | 39 | | | |
| | 1.6 | 5 | | | |
| 5[2] | 1.1 | 45 | 85.6 | 2.9 | 86 |
| | 1.7 | 11 | | | |
| | 1.8 | 34 | | | |
| | 1.6 | 10 | | | |
| 6[2] | 1.1 | 45 | 86.9 | 2.5 | 82 |

TABLE 2-continued

| Serial No. | Recipe | Parts by weight | Ball indentation hardness | Notched impact strength | Vicat A |
|---|---|---|---|---|---|
| | 1.7 | 11 | | | |
| | 1.8 | 29 | | | |
| | 1.6 | 15 | | | |

The moulding materials contain
2 parts by weight of ® Irgastab T 22 M (Ciba Geigy Marienburg GmbH)
1 part by weight of Hoechst OP wax (Hoechst AG, Augsburg)

5 parts by weight of ® Loxiol G 60  
3 parts by weight of ® Loxiol G 31  } (Henkel & Cie, Dusseldorf)

3 parts by weight of antimony trioxide
3 parts by weight of ® Bayertitan R-FKD (Bayer AG, Dormagen)
as additives Flow curves were recorded for the moulding materials 3 to 6.

The results are reproduced in FIG. 1. It follows from FIG. 1 where shear rate v is plotted against viscosity η that moulding materials display better rheological properties, dependent on the amount of additive 1.6) added.

| Ser. No. | Recipe | Parts by weight | Tensile strength | Elongation | Tear propagation resistance | Vicat A | MFI value |
|---|---|---|---|---|---|---|---|
| | 1.1 | 50 | | | | | |
| | 1.3 | 40 | | | | | |
| | 1.9 | 20 | | | | | |
| | 1.2 | 25 | | | | | |
| | plus: | | | | | | |
| 7[1] | 1.8 | 10 | 22.5 | 237 | 71.9 | 80 | 9.5 |
| 8[(1)] | 1.8 | 7 | 22.4 | 240 | 69.1 | 79 | 8.9 |
| | 1.10 | 3 | | | | | |
| 9[(1)] | 1.8 | 7 | 22.7 | 249 | 75.5 | 79 | 8.3 |
| | 1.11 | 3 | | | | | |
| 10[(2)] | 1.8 | 7 | 20 | 226 | 75 | 79 | 11.2 |
| | 1.6 | 3 | | | | | |

All moulding materials contain
3 parts by weight of ® Barostab ZPS7B (Chem. Werke. Minden. Otto-Barlocher GmbH, Munich)
0.2 part by weight of ® Loxiol G 70 (Henkel & Cie, Dusseldorf)
as additives In Table 3, the additive 1.6 according to the invention is compared with other known processing auxiliaries (1.10 and 1.11).

It can be seen from the measurements that additive 1.6, surprisingly, has the largest positive influence on the melt flow (MFI value), with a good overall level of the remaining moulded article properties. Tensile strength according to DIN 53 455 (MPa) Elongation according to DIN 53 455 (%) Tear propagation resistance according to DIN 53 515 (N/mm) Vicat A according to DIN 53 460 (° C.) MFI value 190° C./21.6 kg according to DIN 53 735 (g/10 min) Ball indentation hardness according to DIN 53 456 (MPa 30") Notched impact strength according to DIN 53 453 (kJ/m$^2$)

We claim:

1. Vinyl chloride polymer moulding materials which comprise polyvinyl chloride or copolymers of vinyl chloride with up to 50% by weight of copolymerizable compounds comprising vinyl esters, maleic anhydride or semi-esters of maleic acid and which contain 0.1 to 20% by weight of a thermoplastic polymer of styrene, α-methylstyrene, p-methylstyrene, vinyltoluene, (meth)acrylonitrile, methyl methacrylate or mixtures thereof having a limiting viscosity of 2 to 15 ml/g (measured in dimethylformamide at 25° C.) and a sulphur content of 1.15 to 3.95% by weight.

2. Moulding materials according to claim 1 which additionally contain, relative to 100 parts of moulding material, a polymer of (A) a graft polymer of styrene, α-methylstyrene, methyl methacrylate, acrylonitrile, vinyl chloride or mixtures thereof on an elastomer base having a glass transition temperature (Tg) <0° C., in an amount of up to 80 parts by weight, (B) a resinous thermoplastic copolymer or homopolymer, of styrene, α-methylstyrene, p-methylstyrene, vinyl-toluene, (meth)acrylonitrile, methyl methacrylate or mixtures thereof having a limiting viscosity >0.3 dl/g (measured in dimethylformamide at 25° C.), in an amount of up to 90 parts by weight, or (C) a rubber from the series comprising the diene homo-or diene copolymers, olefine rubbers, or chlorinated polyolefines, in an amount of up to 50 parts by weight, and up to 70 parts by weight of a plasticizer for vinyl chloride polymers.

3. Moulding materials according to claim 1 which contain up to 70 parts by weight of a low molecular weight plasticizer for vinyl chloride polymers.

* * * * *